C. L. REID.
PLOW.
No. 101,380.
Patented Mar. 29, 1870.
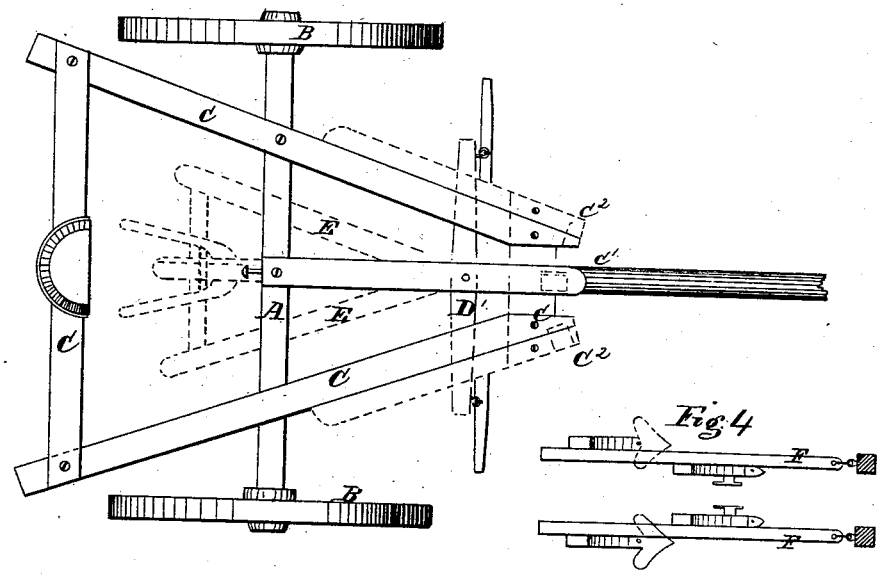
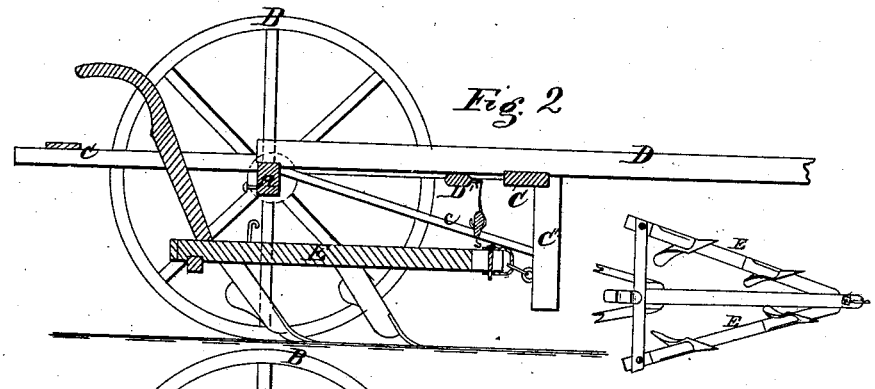
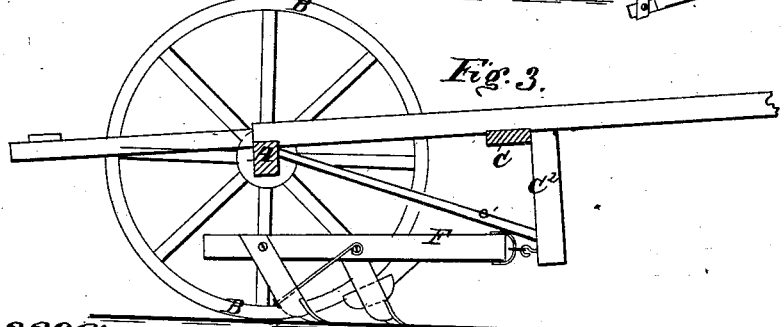
Witnesses:
A. Ruppert
C. F. Clausen
Inventor:
C. L. Reid
D. C. Holloway & Co
Attys

UNITED STATES PATENT OFFICE.

C. L. REID, OF LOUISVILLE, KENTUCKY.

IMPROVEMENT IN CONVERTIBLE PLOW AND CULTIVATOR.

Specification forming part of Letters Patent No. 101,380, dated March 29, 1870.

*To all whom it may concern:*

Be it known that I, C. L. REID, of Louisville, in the county of Jefferson and State of Kentucky, have invented a new and useful Convertible Plow and Cultivator; and I do hereby declare that the following is a full, clear, and exact description thereof, reference being had to the annexed drawings, making part of this specification, in which—

Figure 1 represents a plan view of the machine, showing the "bedder" in dotted lines. Fig. 2 is a sectional elevation on line $x\ x$ of Fig. 1, the machine being arranged for "bedding." Fig. 3 is a similar view of the machine as it appears when arranged for cultivating. Fig. 4 is a plan view of the cultivators; and Fig. 5 is a bottom view of the bedder.

The same letters in the several figures indicate identical parts.

My invention relates to a machine which may be used as a bedder for preparing fields in which cotton is to be sown, or as a cultivator for cultivating corn and other crops; and my improvement consists in the construction of the bedder, and in so constructing and arranging the frame of the machine that it is convertible from a plow or bedder into a cultivator, and vice versa.

To enable those skilled in the art to make and use my invention, I will proceed to describe its construction and operation.

A in the drawings represents the axle of the machine, mounted upon wheels B B.

C represents the frame, consisting of two strong side bars so fastened upon the axle as to coverge toward the front, where they are united together by a permanent cross-beam, the ends of which shall extend a little distance beyond the side bars, so as to afford supports to the detachable hangers $C^2\ C^2$ when the machine is arranged as a cultivator. The rear diverging ends of the side bars are firmly secured together by another cross-beam, upon which a seat is placed for the operator.

C' is a hanger or standard, which is to be detachably secured to the front cross-beam of the frame, midway between the sides, having a staple or other suitable device near its lower end to which to attach the bedder. This hanger is detached, together with its brace $c$, when the machine is arranged as a cultivator.

$C^2\ C^2$ are similar hangers, to which to attach the cultivators. They are fastened to the ends of the front cross-beam of the frame, strengthened by the braces $c'$ and $c^2$, together with which they can be detached to lighten the machine when it is arranged for bedding.

D represents the tongue of the machine, conveniently fastened thereto and carrying a whiffletree, D', in the usual manner.

E represents the bedder, constructed as clearly shown in Fig. 5, consisting of a $\triangle$-shaped frame with two standards secured to the under side of each side bar, said standards carrying plowshares so arranged that opposite shares shall, in plowing, throw the ridges of earth in opposite directions and toward each other, so that a "bed" shall be formed of the width of four furrows. A shovel-plow is arranged on the rear end of the center beam, the front end of which is provided with a clevis to connect the bedder by a suitable device to the hanger C' of the main frame. Suitable handles and a hook by which to hang it upon the pin on the axle are also secured to it at the proper points.

Fields in which cotton is to be sown have to be "bedded," as it is termed—that is, four ridges of earth are alternately thrown up together to form beds—which operation now necessitates the employment of two men with single plows with which they have to traverse the field twice to make one bed. With my bedder, which can be manipulated by one man and two horses, a bed is formed by traversing the field once, thus economizing time and labor.

F F represent two cultivator-plows, which may be constructed in any approved manner. They are to be so attached to the hangers $C^2\ C^2$ of the main frame that they may be moved laterally and vertically to adapt them to any width the rows of crops may be apart, and for plowing any desired depth.

Having thus described my invention, what I claim, and desire to secure by Letters Patent, is—

1. The bedder E, constructed substantially as shown and described.

2. The combination of the frame C with the hanger C' and bedder E, substantially as set forth.

3. The arrangement of the hangers C' and C², bedder E, and cultivators F, when combined with the frame C, so that the machine may be converted from a cultivator into a bedder, or vice versa, as set forth.

In testimony whereof I have signed my name to this specification in the presence of two subscribing witnesses.

C. L. REID.

Witnesses:
W. B. HOPE,
S. S. ENGLISH.